No. 862,233. PATENTED AUG. 6, 1907.
F. BERNHARDT.
WASHING AND RINSING MACHINE FOR FIBROUS MATERIALS.
APPLICATION FILED JAN. 4, 1905.
3 SHEETS—SHEET 1.
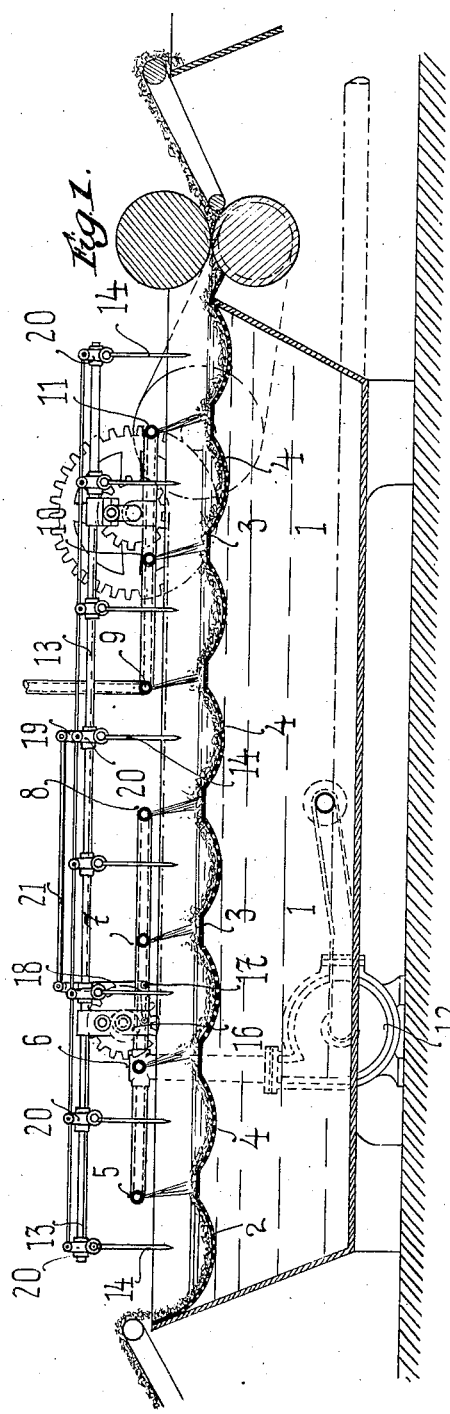
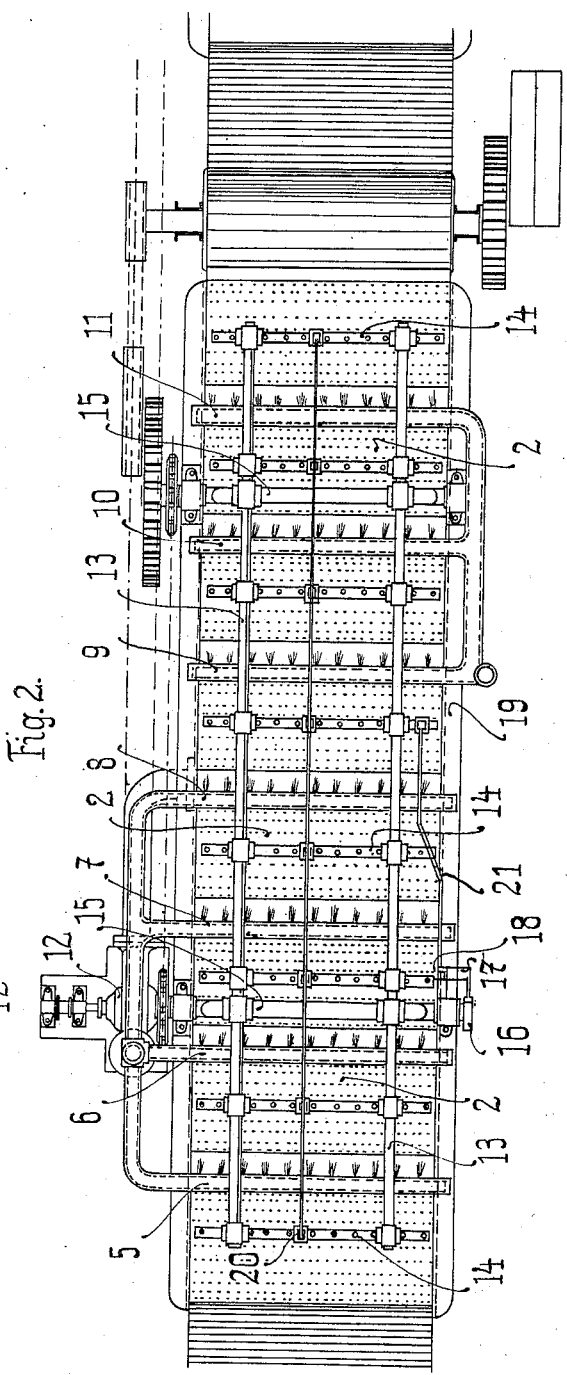
Witnesses
Inventor
Friedrich Bernhardt
ATTORNEYS No. 862,233. PATENTED AUG. 6, 1907.
F. BERNHARDT.
WASHING AND RINSING MACHINE FOR FIBROUS MATERIALS.
APPLICATION FILED JAN. 4, 1905.
3 SHEETS—SHEET 2.
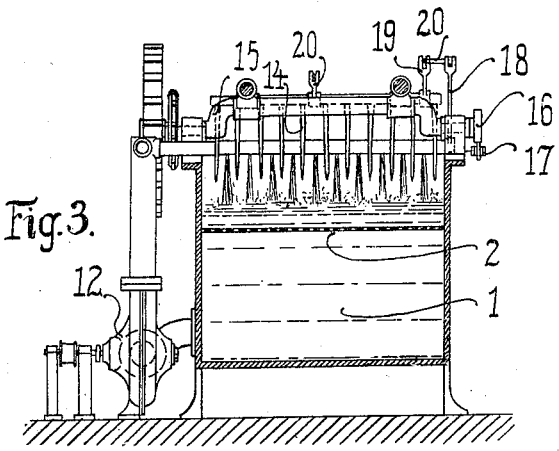
Fig. 3.
Fig. 4.
Fig. 5.
Fig. 6.
Fig. 7.
Fig. 8.
Fig. 9.
Witnesses
J. H. McKuhne
John A. Percival.
Inventor
Friedrich Bernhardt
By Richardson
ATTORNEYS
THE NORRIS PETERS CO., WASHINGTON, D. C.

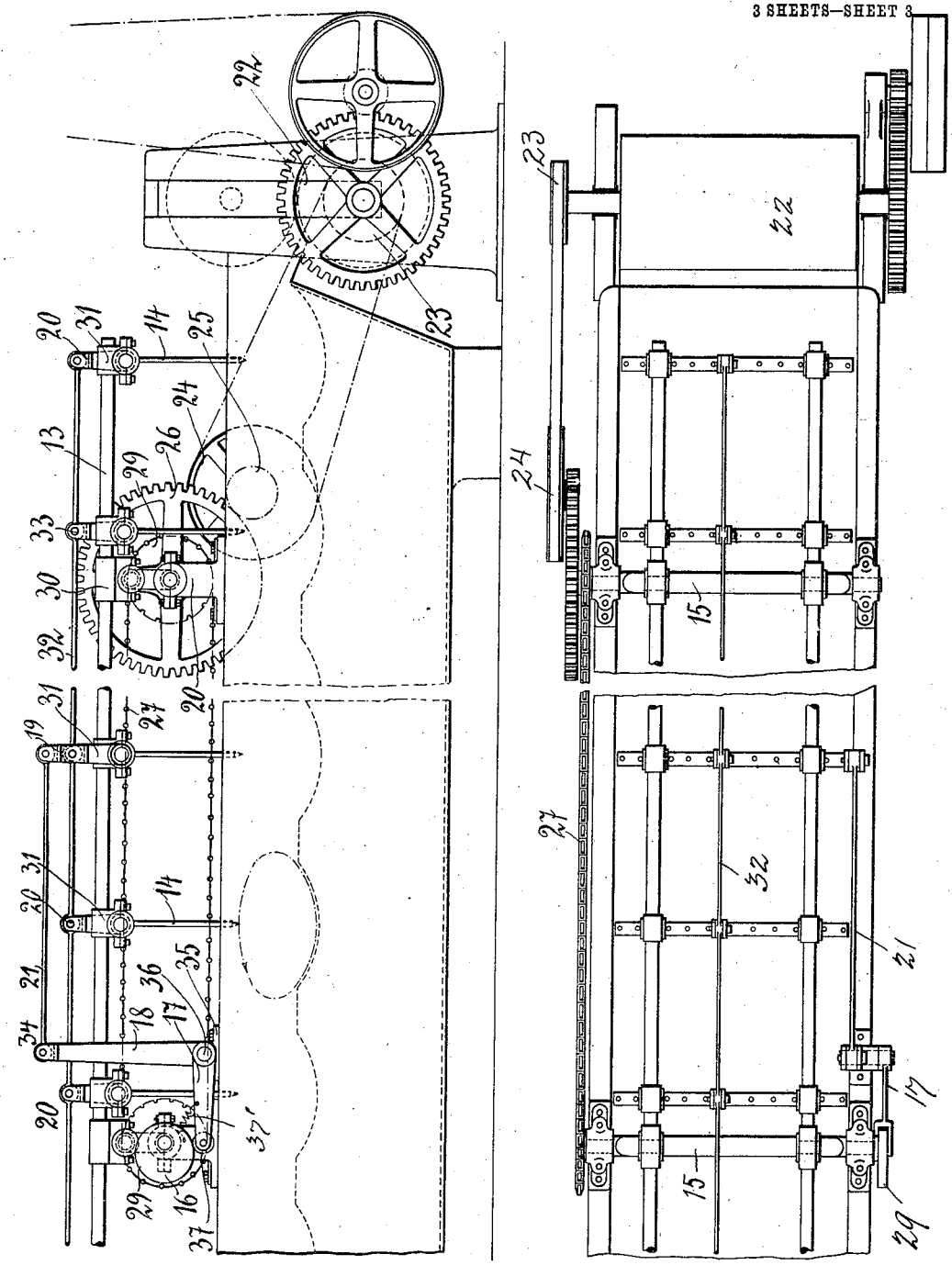

UNITED STATES PATENT OFFICE.

FRIEDRICH BERNHARDT, OF LEISNIG, GERMANY.

WASHING AND RINSING MACHINE FOR FIBROUS MATERIALS.

No. 862,233.  Specification of Letters Patent.  Patented Aug. 6, 1907.

Application filed January 4, 1905. Serial No. 239,653.

*To all whom it may concern:*

Be it known that I, FRIEDRICH BERNHARDT, of the city of Leisnig and Empire of Germany, have invented certain new and useful Improvements in Washing and Rinsing Machines for Fibrous Materials; and I do hereby declare the following to be a full, clear, and exact description of the invention, such as will enable others skilled in the art to which it pertains to make and use it, reference being had to the accompanying drawings, which form part of this specification.

According to my invention a number of rows of powerful continuous liquid-jets are employed, while the fibrous material is conveyed through the machine by a system of rakes. In this invention the material is treated on plates lying in the liquor, so that the dirt dissolved is readily removed, these plates however, being located at but a slight depth below the surface of the bath, where the jet-pipes are disposed, so that the action of the jets on the material is vigorous. Since the whole of the material under treatment is thus exposed to the continuous action of the jets, and since, moreover escape of the fibers and descent into the bath, is prevented by the plates, the fibers are well distributed over the surface and thoroughly cleansed. The duration of play of the jets and thus their action, on the material, can be prolonged, or intensified, by employing plates presenting corrugations, ridges, projections, or the like. Between each two adjacent plates perforated troughs, of wellknown description, are provided, into which the material, after treatment on the plates, are further acted upon by the jets, whereby the dirt which has been dissolved is prevented from settling in the fibers.

For the purpose of conveying the material from the one plate to the next, a rake mechanism having turning prongs is employed, the points of which follow a path which is a closed curve, corresponding to the dip of the troughs, whereby regular advance of the material through the machine is insured.

The jets of liquor, the number of which corresponds to the number of plates employed, work with great rapidity and may be directed either by pressure from a reservoir located above, or by a pump or like liquid raising apparatus.

For the purpose of economizing the detergents and water employed, only a certain quantity of fresh liquor is supplied, a number of the jets being fed from the tank itself. In this manner the supply of fresh liquor can be reduced without the capacity of the machine being affected, since the liquor in the tank, which has been used before is pumped to the first series of jets and used over again.

The essential features of the invention are as follows: The cleansing of the material while lying in but a small depth of liquor, by means of the distributing action of powerful jets of liquid, the material lying on plates of any desirable cross-section located in the scouring- or rinsing- tank. The combination with the plates of sieved or perforated-bottomed troughs, into which the fibrous material passes after being washed or rinsed; the employment of rakes, which uniformly and effectively advance the material from one plate to another. In this manner, active, thorough, and exceedingly efficient washing scouring or rinsing of the material is effected.

The machine may be employed for the most various classes of material, such as wool, cotton, noils, combings, threads etc., likewise for rags and similar materials and fibers employed in paper-making and other industries; and in view of the extremely high capacity, very little space is necessary as compared with other machines serving a similar purpose.

One form of construction of the new machine is illustrated in the accompanying drawings, in which Figure 1 is a vertical section, Fig. 2 a plan, and Fig. 3 a cross-section of the machine. Fig. 4—9 are cross-sections illustrating various forms of plates and troughs which may be employed to receive the material. Figs. 10 and 11 are, respectively, an end elevation and plan view, illustrating the driving mechanism of the washing and rinsing machine generally and that of the conveying rake particularly.

The cistern or tank 1 for holding the scouring-liquor, wash, or rinsing-water, is provided with a false-bottom or partition 2, of such construction that it presents a number of washing-plates, tables or surfaces (in the present case seven) 3, and alternating therewith, perforated troughs 4. The material being treated is conducted over these surfaces 3, 4, and on the former is played upon directly by powerful jets of the scouring-agent or water, by means of the pipes 5—11 in succession, while the dirt which has been dissolved or washed out, falls through the perforations in the troughs 4 and sinks to the bottom of the tank 1. At the end of the machine the material with the superfluous fluid, passes over the edge of the tank to a pair of squeezers or pressing-rollers. The first pipes 5—8 are fed by means of a centrifugal pump 12, from the tank 1 while the pipes 9—11 are fed with fresh liquor.

The velocity of flow of the jets, and the height of the scouring-agent or wash above the false-bottom 2, must be adapted to the nature of the material to be dealt with. In the case of close material such as rags, threads, cotton etc., strong jets and a slight depth of liquor above the plates will be employed; whereas in the case of material, such as sheeps wool, which requires careful handling, the jets must naturally not be too powerful and the height of the wash above the false-bottom 2 must be ample.

The material is conveyed from plate to plate by means of a rake device 13, with turning prongs 14. This rake is carried by two crank-shafts 15, which on their rotation impart to it a rotary motion. In addition to this latter motion the prongs 14 receive a reciprocating motion by means of an eccentric 16 mounted on one of the crank-shafts 15 and the roller lever 17 and coöperating levers 18, 19, 20 and connecting-rod 21. These two motions being imparted simultaneously, the prongs 14 describe a closed, more or less oval curve, the lower part of which follows the bend or dip of the troughs 4, so that removal of the whole of the material from the latter is insured.

The washing and rinsing machine is driven from the press. A pulley 23, being mounted on the lower pressing roller 22, works upon a pulley 24 by means of a belt, the former being firmly attached to a gear wheel 25. This gear wheel 25 drives another gear wheel 26, which is mounted on a crank shaft 15. A second crank shaft 15 is operated by the first one by means of a chain 27 and two chain wheels 29. The crank shafts 15 work in suitable bearings and support by means of the bearings 30, the rods 13 to which the bearings 31 for the movable conveying prongs 14 are attached. Each of these prongs bears in its middle a lever 20 and these levers are connected to each other by the rod 32 and bolt 33.

One of the prongs 14 bears at one end a lever 19, which is connected, by means of the rod 21 and bolt 34, with the lever 18. This lever 18 is firmly fastened, together with lever 17, on a shaft 36, rotating in the bearing 35. Lever 17 bears on its fore-end a roller 37. This roller is operated by an eccentric 16, that is attached to the one end of the crank shaft 15 a spring 37' keeps the roller in contact with the eccentric.

The washing-and rinsing plates may be of any desired cross-section, depending upon the nature of the material. The section shown in Fig. 4 is especially adapted for extra long material, that shown in Figs. 5 and 8 for very short material, whereas the sections shown in Figs. 6, 7 and 9 may be employed for material, such as rags etc., which require energetic treatment.

It must be understood that I do not in any way limit myself to the precise construction of apparatus shown in the drawings, as the machine admits of great variation in point of detail; in particular, the methods of arranging and feeding the jets and the system of constructing and operating the rake-mechanism may be greatly modified.

It will be further understood that any number of these machines may be employed in continuous succession, for instance when washing, scouring and rinsing is carried on in three separate tanks.

1. A machine for washing, scouring and rinsing fibrous materials, comprising a tank having at the upper part a false-bottom presenting alternating tables and perforated troughs, a system of liquid-jet pipes directed upon said bottom and a rake-mechanism located above the false-bottom, and means for actuating the rake-mechanism, substantially as described.

2. A machine for washing, scouring and rinsing fibrous materials, comprising a tank having at the upper part a false-bottom presenting alternating tables and perforated troughs, a system of jet-pipes directed upon the tables and rake-mechanism located above the false-bottom, means for imparting a circular motion to the rake-mechanism, and means for imparting a reciprocatory motion to the latter, substantially as described.

3. A machine of the class described comprising a tank having at the upper part a false bottom presenting alternating tables and perforated troughs, a system of jet pipes directed upon the tables, rake mechanism located above the false bottom and means for imparting a circular motion to the rake mechanism, substantially as described.

4. A machine for washing, scouring, and rinsing fibrous materials, comprising a tank having at the upper part a false-bottom presenting alternating tables and troughs, a system of jet-pipes directed upon the tables and a rake-mechanism located above the false-bottom crank-shafts carrying the rake-mechanism an eccentric on one of the crank-shafts, and lever-mechanism operated by the eccentric for imparting a reciprocatory motion to the rake-mechanism, substantially as described.

In witness whereof I have hereunto signed my name in the presence of two subscribing witnesses.

FRIEDRICH BERNHARDT.

Witnesses:
JOHANN GEORG BERNHARDT,
RUDOLPH FRICKE.